United States Patent
Finkelshtein et al.

(10) Patent No.: US 11,374,838 B1
(45) Date of Patent: Jun. 28, 2022

(54) USING A DATA PROCESSING UNIT (DPU) AS A PRE-PROCESSOR FOR GRAPHICS PROCESSING UNIT (GPU) BASED MACHINE LEARNING

(71) Applicant: MELLANOX TECHNOLOGIES, LTD., Yokneam (IL)

(72) Inventors: Dotan Finkelshtein, Yokneam Illit (IL); Opher Gavriel Reviv, Kadima (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 19 days.

(21) Appl. No.: 17/214,945

(22) Filed: Mar. 29, 2021

(51) Int. Cl.
*H04L 29/06* (2006.01)
*H04J 3/06* (2006.01)
*H04L 29/12* (2006.01)
*H04L 43/0876* (2022.01)

(52) U.S. Cl.
CPC .............................. *H04L 43/0876* (2013.01)

(58) Field of Classification Search
CPC .................................................. H04L 43/0876
See application file for complete search history.

(56) References Cited

U.S. PATENT DOCUMENTS

| | | | | |
|---|---|---|---|---|
| 6,564,267 B1* | 5/2003 | Lindsay | ............... | H04L 69/166 370/465 |
| 10,116,674 B2* | 10/2018 | Baradaran | ........... | H04L 63/1416 |
| 10,902,121 B2* | 1/2021 | Chari | ....................... | G06F 8/433 |
| 2005/0108518 A1* | 5/2005 | Pandya | ................... | H04L 63/20 713/153 |
| 2014/0122834 A1* | 5/2014 | Ganguli | .............. | G06F 11/3433 712/30 |
| 2014/0280857 A1* | 9/2014 | Yang | ....................... | H04L 67/30 709/223 |
| 2017/0201537 A1* | 7/2017 | Caldwell | ............. | H04L 63/1416 |
| 2017/0245170 A1* | 8/2017 | Henry | ................. | H04L 41/0806 |
| 2018/0288198 A1* | 10/2018 | Pope | ........................ | H04L 41/16 |
| 2019/0012350 A1* | 1/2019 | Sindhu | .............. | G06F 15/17337 |
| 2019/0347578 A1* | 11/2019 | Bolding | .............. | H04L 63/1416 |
| 2020/0021532 A1* | 1/2020 | Borikar | ................... | H04L 69/22 |

FOREIGN PATENT DOCUMENTS

CN 102299843 A 12/2011

OTHER PUBLICATIONS

Nvidia Corporation, "Nvidia Introduces New Family of BlueField DPUs to Bring Breakthrough Networking, Storage and Security Performance to Every Data Center", Press Release, pp. 1-2, Oct. 5, 2020 downloaded from https://nvidianews.nvidia.com/news/nvidia-introduces-new-family-of-bluefield-dpus-to-bring-breakthrough-networking-storage-and-security-performance-to-every-data-center.

(Continued)

*Primary Examiner* — Christopher B Robinson
(74) *Attorney, Agent, or Firm* — Kligler & Associates Patent Attorneys Ltd

(57) ABSTRACT

A system includes a network adapter and a processor. The network adapter is configured to receive packets from a network, to process the received packets in accordance with a policy, and to derive a packet digest from the received packets. The processor is configured to adapt the policy based on the packet digest derived by the network adapter, and to provide the adapted policy to the network adapter for subsequent packet processing.

10 Claims, 2 Drawing Sheets

(56) References Cited

OTHER PUBLICATIONS

Nvidia Corporation, "Nvidia BlueField-2 DPU", Datasheet, pp. 1-2, Apr. 21, 2021 downloaded from https://www.nvidia.com/content/dam/en-zz/Solutions/Data-Center/documents/datasheet-nvidia-bluefield-2-dpu.pdf.

Dignan, "VMware, Nvidia Integrate on Architecture, Technology as they Accelerate AI Adoption", ZDNet, pp. 1-6, Sep. 29, 2020 downloaded from https://www.zdnet.com/article/vmware-nvidia-integrate-on-architecture-technology-as-they-aim-to-accelerate-ai-adoption/.

Anderson et al., "Deciphering Malware's use of TLS (without , Decryption)", pp. 1-15, Jul. 6, 2016 downloaded from https://arxiv.org/pdf/1607.01639.pdf.

\* cited by examiner

USING A DATA PROCESSING UNIT (DPU) AS A PRE-PROCESSOR FOR GRAPHICS PROCESSING UNIT (GPU) BASED MACHINE LEARNING

FIELD OF THE INVENTION

The present invention relates generally to network communications, and particularly to monitoring and management of data traffic in communication networks.

BACKGROUND OF THE INVENTION

Systems for monitoring and management of network communications have been previously proposed in the patent literature. For example, Chinese Patent CN 102299843 describes a network data processing method based on a graphic processing unit (GPU) and a buffer area. The method is characterized in that: a pretreatment thread in a pretreatment thread group carries out pretreatment uninterruptedly to received network data packets so as to form a calculating task which is sent to the buffer area; a calculating thread in a calculating thread group takes out one calculating task uninterruptedly from the buffer area and gives CPU to carry out calculation or takes out a plurality of the calculating tasks for the GPU to carry out the calculation, and then a calculation result is sent to a subsequent thread group; a subsequent processing thread in a subsequent processing thread group carries out subsequent processing uninterruptedly to the calculation result sent by the calculating thread of the calculating thread group after completing the calculating task. The invention also discloses a network data processing system based on the GPU and the buffer area.

SUMMARY OF THE INVENTION

An embodiment of the present invention that is described hereinafter provides a system including a network adapter and a processor. The network adapter is configured to receive packets from a network, to process the received packets in accordance with a policy, and to derive a packet digest from the received packets. The processor is configured to adapt the policy based on the packet digest derived by the network adapter, and to provide the adapted policy to the network adapter for subsequent packet processing.

In some embodiments, the network adapter is configured to derive the packet digest by performing at least one of (i) extracting metadata from the received packets and (ii) applying data reduction to the received packets.

In some embodiments, the network adapter is configured to derive the packet digest by setting one or more counters in response to the received packets, and the processor is configured to adapt the policy in response to the one or more counters.

In an embodiment, the network adapter is configured to apply a security policy to the received packets, and to derive the packet digest by deriving a traffic pattern of at least some of the received packets, and the processor is configured to detect an anomaly in the traffic pattern, and to adapt the security policy applied by the network adapter in response to the anomaly.

In another embodiment, the network adapter is configured to apply traffic shaping to the received packets in accordance with a Quality-of-Service (QoS) policy, and the processor is configured to adapt the QoS policy applied by the network adapter in response to the packet digest.

In some embodiments, the processor is configured to adapt the policy by applying a machine learning (ML) algorithm to the packet digest derived by the network adapter.

In some embodiments, the network adapter is a data processing unit (DPU). In other embodiments, the processor is a graphical processing unit (GPU).

There is additionally provided, in accordance with another embodiment of the present invention, a method including, in a network adapter, receiving packets from a network, processing the received packets in accordance with a policy, and deriving a packet digest from the received packets. In a processor that is separate from the network adapter, the policy is adapted based on the packet digest derived by the network adapter, and the adapted policy is provided to the network adapter for subsequent packet processing.

The present invention will be more fully understood from the following detailed description of the embodiments thereof, taken together with the drawings in which:

DETAILED DESCRIPTION OF EMBODIMENTS

Overview

Figure 1:
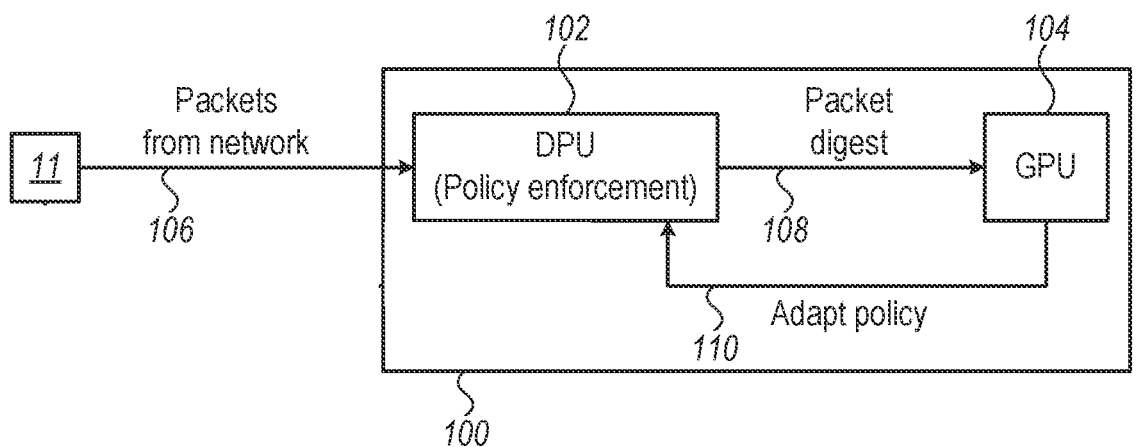
FIG. 1 is a block diagram that schematically illustrates a system for adaptive monitoring and policy enforcement on network data traffic, in accordance with an embodiment of the present invention.

Communication infrastructure needs dynamic policies for tasks such as preventive maintenance and security, for example to detect imminent hardware failures and for zero-day attack prevention. Data reduction and metadata extraction may be used for obtaining useful indicators for such policies. However, network traffic varies significantly based on applicative use, geography, network topology and other factors. As such, the information obtainable from network traffic is typically noisy, has non-uniform accuracy and does not lend itself easily to productive monitoring. Common software solutions for metadata extraction and data reduction cannot support the required scale of traffic volume.

Embodiments of the present invention that are described hereinafter provide systems and methods that combine a processor (e.g., a graphical processing unit (GPU)) and a network adapter (e.g., a data processing unit (DPU) or "Smart NIC") to address the above needs for dynamic policies. In some embodiments, a DPU receives packets from a network, and processes the received packets in accordance with a policy, e.g., a security or Quality-of-Service (QoS) policy. In addition, the DPU derives a "packet digest" from the packets, using metadata extraction and/or data reduction, and provides the packet digest to the GPU. The GPU adjusts the policy based on the packet digest, e.g., by running a machine learning (ML) algorithm. The adjusted policy is fed-back to the DPU, which in turn uses it to process subsequent packets. The above-described process is typically repeated by the DPU and GPU on an on-going basis. As a result, the policy is continuously matched to the current characteristics of the packet traffic.

In some embodiments, the DPU is programmable to classify packets and flows, and to apply various policies to them. The classification capabilities may include, for example, the ability to parse, classify and provide various relevant fields of communication layers that (i) define communication data format (e.g., in Layer 2 of the OSI model), (ii) decide on communication traffic paths (e.g., in Layer 3), and (iii) use communication transmission protocols such as TCP and UDP (in Layer 4).

In some embodiments, the DPU performs stateful identification of Layer 4 bi-directional connections (e.g., either TCP or UDP). The DPU software/hardware architecture further allows for Transport Layer Security (TLS) and Internet Protocol Security (IPsec) decryption. These capabilities, combined with searching capabilities (e.g., using regular expressions) and deep packet inspection in the DPU, allows access to practically any Layer 2 to Layer 7 (L2-L7) field.

In some embodiments, the DPU comprises hardware engines that may apply suitable policies by performing packet/flow actions such as decryption, encryption, counting, marking, shaping, dropping, forwarding, modification and the like.

In some embodiments, the classification capabilities and the counters provided by the DPU are used by the disclosed technique for packet-digest derivation, e.g., data reduction and/or metadata extraction. The DPU feeds the packet digests to the GPU to run a dynamic ML model. The programmable policy capabilities of the DPU are set by the GPU, in accordance to the output of the GPU ML model. Traffic going through the DPU to a host of a system comprising the DPU-GPU pair is hence controlled by the results of the GPU artificial-intelligence (AI) computation.

In one embodiment, a system comprising a DPU and a GPU functioning together as described above is used for anomaly detection in the received packets, and for adjusting and enforcing a security policy. In this example embodiment, the DPU provides the following metadata to the GPU-run model: L7 application ID, L3-L4 flow identification such as a 5-tuple, packet and byte counters per flow, timing information of sampled connections, and other relevant extracted fields. The DPU may provide such metadata for encrypted traffic, as well. The entire metadata extraction process is done in an accelerated way by the DPU with no host intervention.

In this manner, an entire data flow may be reduced to a limited-size, uniform digest that is independent of the size of the flow. Thus, for example, the DPU may derive similar-size packet digests for a large "elephant" flow and for a short flow such as DNS. The AI model running on the GPU may be pre-trained on the applicable traffic pattern on various layers, and is able to identify various abnormalities in traffic patterns by applying inference to the packet digests. Once the model run by the GPU detects an anomaly, the DPU adjusts the security policy accordingly. The updated policy may cause the DPU to perform, for example, actions such as directing traffic to a scrubbing server, generating a relevant security log, dropping relevant traffic, and/or further classifying suspected packets.

Another example use-case is a system in which the DPU and GPU dynamically handle the Quality-of-Service (QoS) of traffic. In many practical scenarios the desire is to shape traffic based on various L4-L7 properties. These properties, however, often change and vary over geography and over time (e.g., at different times-of-day, or on weekdays vs. weekends). A predefined rigid policy is unlikely to be flexible enough to react to changing traffic patterns at various locations in the network, or over time. Thus, in some embodiments, the DPU derives the L4-L7 metadata mentioned above, and provides this digest to the GPU. The GPU applies a ML model to the metadata, so as to adapt a stateful traffic shaping policy applied by the DPU.

Additionally, or alternatively, the disclosed techniques can be used for adapting policies relating to network monitoring, network engineering, Distributed Denial of Service (DDoS) detection and prevention, network firewall, and many others.

By using the above-described interaction and "division of labor" between a processor (e.g., GPU) and a network adapter (e.g., DPU), the disclosed techniques enable identifying and applying dynamic policies to network traffic, while best exploiting the relative advantages of each system element.

SYSTEM DESCRIPTION

FIG. 1 is a block diagram that schematically illustrates a system 100 for adaptive monitoring and policy enforcement on data traffic received from a network 11, in accordance with an embodiment of the present invention. System 100 may be, for example, part of a server in a data center.

System 100 of FIG. 1 comprises a network adapter (in the present example a DPU 102) and a processor (in the present example a GPU 104). Although the embodiments described below refer mainly to a DPU and a GPU, the disclosed techniques can be implemented using any other suitable network adapter and processor, respectively. In various embodiments, the network adapter may comprise, for example, a DPU (also referred to as "Smart NIC"), an Ethernet Network Interface Controller (NIC), an Infiniband Host Channel Adapter (HCA), a network-enabled GPU, or any other suitable type of network adapter. The processor may comprise, for example, a GPU, a CPU, or any other suitable type of processor.

As seen in the figure, DPU 102 of system 100 receives packets from network 11 over a network link 106, and processes the received packets in accordance with a policy. DPU 102 derives a "packet digest" from the received packets, and provides the packet digest to GPU 104 over an interface 108. GPU 104 adapts the policy based on the packet digest, and provides the adapted policy to DPU 102 over an interface 110 for subsequent processing of packets. In a typical embodiment, interfaces 108 and 110 are both implemented over a bus connecting DPU 102 and GPU 104, e.g., a PCIe bus.

In the present context, the term "packet digest" of a group of packets (e.g., a flow) refers to any appropriate compressed representation of a group of packets, wherein the representation is considerably smaller in data size than the group of packets but nevertheless characterizes the group. In some embodiments, DPU 102 is configured to derive the packet digest by performing at least one of (i) extracting metadata from the received packets and (ii) applying data reduction to the received packets. To this end, DPU 102 may comprise one or more counters (not shown) that, for example, count the number of packets per flow, per port number, or per any other suitable packet attribute or combination of packet attributes.

In some embodiments, DPU 102 applies a certain policy to the received packets. GPU 104 runs an AI-based algorithm to detect an anomaly in the traffic pattern seen by DPU 102, based on the packet digest. GPU 104 adapts the security policy applied by DPU 102 in response to the anomaly. One example of such adaptive policy is QoS policy, another example is a security policy, e.g., a policy for DDoS detection and prevention.

In some embodiments, DPU 102 and GPU 104 of system 100 may be implemented in a single System-on-Chip (SoC). In various embodiments, the different elements of system 100 shown in FIG. 1 may be implemented using suitable hardware, such as using one or more discrete components, one or more Application-Specific Integrated Circuits (ASICs) and/or one or more Field-Programmable Gate Arrays (FPGAs), or in any other suitable way. Some of the functions of DPU 102 and/or GPU 104 may be implemented in one or more general-purpose processors that are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Figure 2:
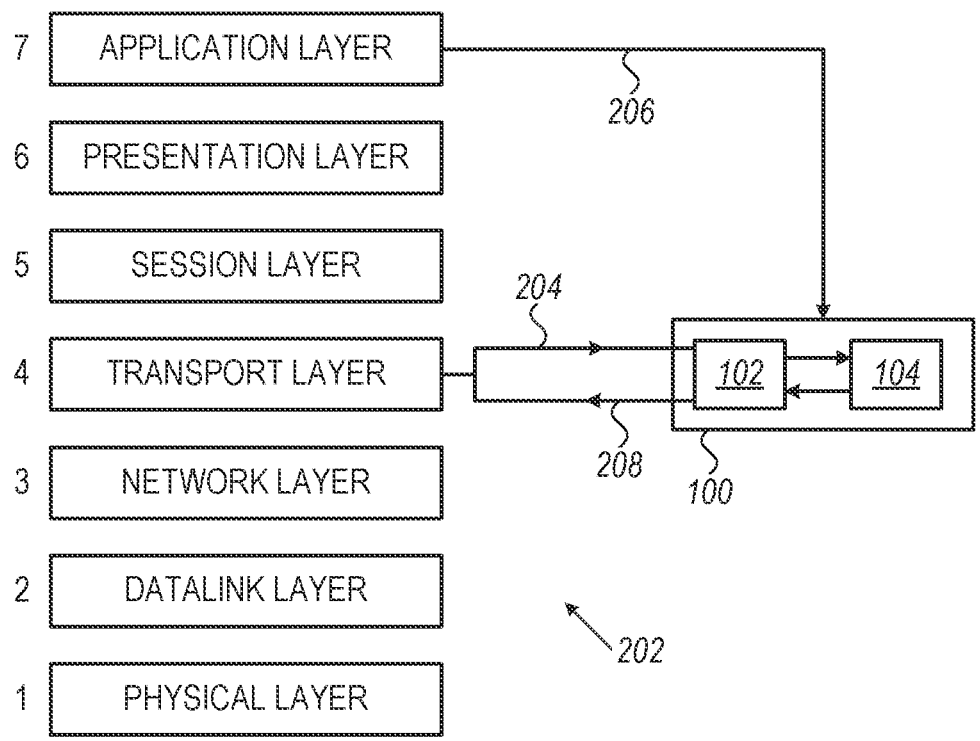
FIG. 2 is a diagram that schematically illustrates extraction of metadata from multiple communication layers, in accordance with an embodiment of the present invention.

Joint DPU-GPU Operation for Monitoring and Traffic Management Using Multi-Layer Metadata Extraction FIG. 2 is a schematic diagram that illustrates how the system of FIG. 1 extracts metadata from the multiple OSI-model layers of the received traffic, in accordance with an embodiment of the present invention. In the present example, the metadata is used in applying a security policy, to detect a traffic anomaly in layer L4, related to a given application in L7.

In the shown embodiment, GPU 104 runs an ML algorithm on metadata provided by DPU 102. The metadata comprises the following: L7 application ID (provided via link 206), L3-L4 bi-directional traffic, packet and byte counters per flow, timing information of sampled connections, and other relevant extracted fields.

GPU 104 has set a policy via link 208 so that only relevant traffic (204) arrives at the DPU. When a packet arrives, the DPU verifies whether the packet belongs to a new L4 bi-directional connection. If so, the DPU creates a new entry at a connection table, saves the connection details, sets a hardware marking rule for the connection, sets a sample rate for the connection (enforced by hardware) and connects hardware counters to the rules (using link 208).

The DPU continues to analyze the connection at Layer 7, e.g., using a deep packet inspection (DPI) library and suitable regular expression (Regex) offloads. When sufficient DPI information is collected (e.g., after four payload-bearing packets) the DPU sets the connection to a hardware bypass mode. From this point there is no need for future deep packet inspection for subsequent packets of this connection, as a decision was already made.

For sampled flows, more packet-related information is collected by the DPU. When the hardware/software recognizes that a flow has been terminated, the DPU generates a data structure using the extracted L7 metadata (e.g., L7 application name, field-values, etc.), the L4 connection properties, the sampling data and the related hardware counters. This data structure is used as an input for the ML GPU-based training and inference. At inference time, the result of the trained GPU-based ML model is processed by the DPU, which then applies the necessary action to the rest of the traffic.

If the ML model detects an anomaly that might indicate a cyberattack, GPU 104 instructs DPU 102 to initiate a suitable responsive action, e.g., dropping of packets belonging to an ongoing attack, forwarding of traffic to a scrubbing server, notification of other nodes of this attack and generating of logs and alerts.

FIG. 2 shows only one possible embodiment. In a different example, when the ML model is used for autonomous traffic shaping, the results of the GPU may be used by the DPU to alter the traffic-shaping policy to better suit evolving traffic scenarios.

Figure 3:
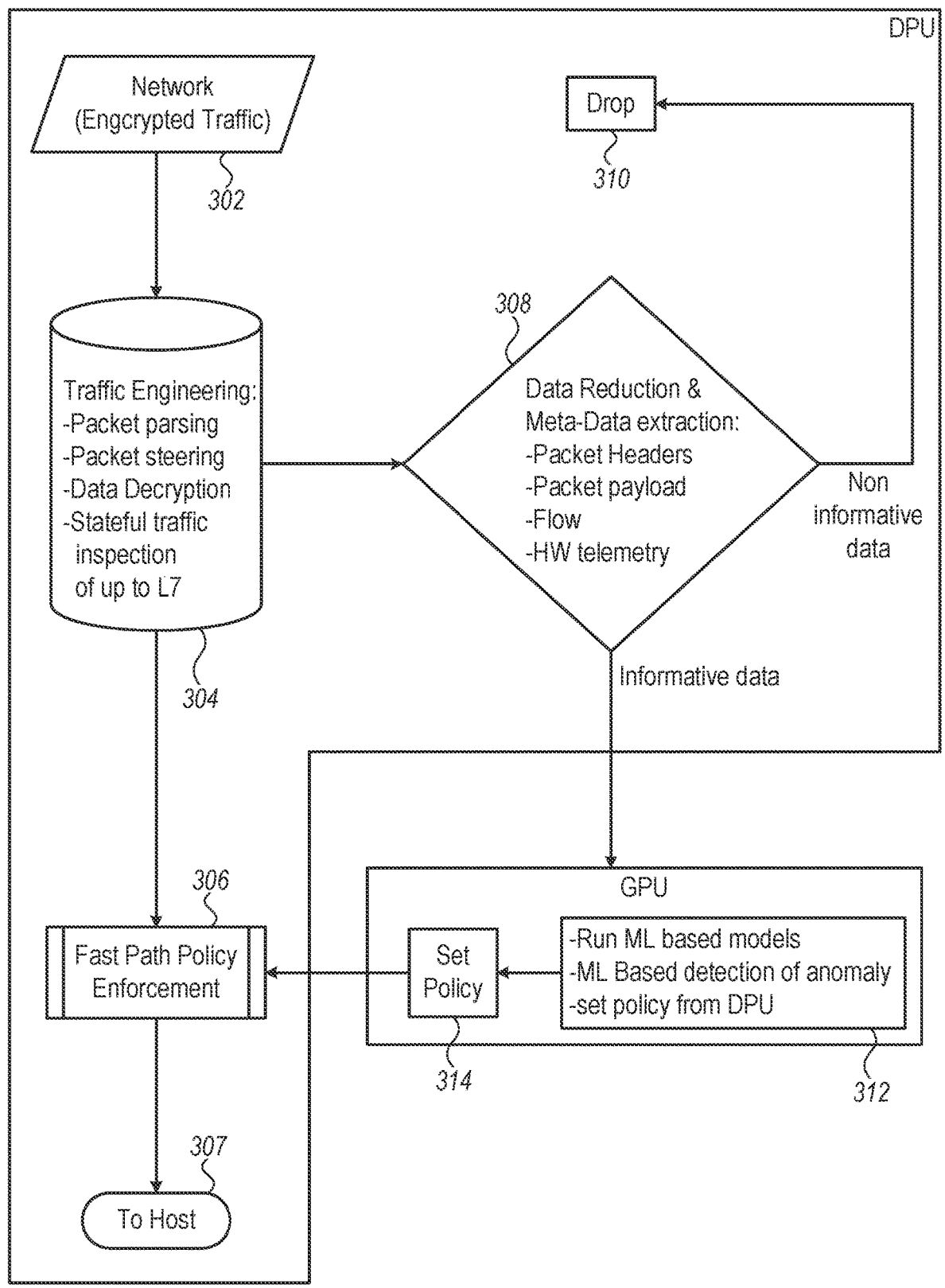
FIG. 3 is a flow chart schematically describing a method for adaptive monitoring and policy enforcing on a network using the system of FIG. 1, in accordance with an embodiment of the present invention.

Method for Adaptive Monitoring and Management of Network Data Traffic Using DPU and GPU Running a ML Algorithm FIG. 3 is a flow chart schematically describing a method for adaptive monitoring and policy enforcing on a network using the system of FIG. 1, in accordance with an embodiment of the present invention. The algorithm according to the presented embodiment carries out a process that begins with DPU 102 performing traffic engineering of network traffic 302, at a traffic engineering step 304. Step 304 includes packet parsing, packet steering, data decryption and stateful data inspection of layers L4-L7.

Next, DPU 102 performs data reduction and metadata extraction, at a metadata generating step 308. This step includes extracting packet headers, extracting information on packet payload, extracting traffic flow pattern and receiving hardware telemetry (e.g., temperatures and power consumption of involved components).

As seen, DPU 102 drops non-informative data in a dropping step 310.

Next, GPU 104 runs an ML model to detect, for example, a traffic anomaly, or traffic inefficiency, and to set an updated policy, at a network analysis and policy setting step 312.

As seen, based on the output of step 312, GPU 104 commands DPU 102 to update an already existing policy 306, at a policy setting step 314. The updated policy is communicated to a host of the system comprising the DPU-GPU pair, at policy communicating step 307.

The flow chart shown in FIG. 3 is depicted by way of example, to describe the concept of the disclosed technique. Other suitable applications may be run using the DPU and GPU, such as for preventive maintenance.

Although the embodiments described herein mainly address network communications, the methods and systems described herein can also be used in other applications, such as in Network monitoring, Network engineering, Anti-Distributed Denial of Service (DDoS), Network Firewalls, etc.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a network adapter, to receive a flow of packets from a network, to process the received flow in accordance with a security policy, and to extract, from the received packets of the flow, a traffic pattern of at least some of the received packets, the traffic pattern being representative of the flow and independent of a size of the flow; and
a processor, to detect an anomaly in the traffic pattern extracted by the network adapter, to adapt the security policy in response to the anomaly, and to provide the adapted security policy to the network adapter for subsequent packet processing.

2. The system according to claim 1, wherein the network adapter is to extract the traffic pattern by setting one or more counters in response to the received packets, and wherein the processor is to adapt the security policy in response to the one or more counters.

3. The system according to claim 1, wherein the processor is to adapt the security policy by applying a machine learning (ML) algorithm to the traffic pattern extracted by the network adapter.

4. The system according to claim 1, wherein the network adapter is a data processing unit (DPU).

5. The system according to claim 1, wherein the processor is a graphical processing unit (GPU).

6. A method, comprising:
in a network adapter, receiving a flow of packets from a network, processing the received flow in accordance with a security policy, and extracting, from the received packets of the flow, a traffic pattern of at least some of the received packets, the traffic pattern being representative of the flow and independent of a size of the flow; and
in a processor that is separate from the network adapter, detect an anomaly in the traffic pattern extracted by the network adapter, adapting the security policy in response to the anomaly, and providing the adapted security policy to the network adapter for subsequent packet processing.

7. The method according to claim 6, wherein extracting the traffic pattern comprises setting one or more counters in response to the received packets, and wherein adapting the security policy is performed in response to the one or more counters.

8. The method according to claim 6, wherein adapting the security policy comprises applying a machine learning (ML) algorithm to the traffic pattern extracted by the network adapter.

9. The method according to claim 6, wherein the network adapter is a data processing unit (DPU).

10. The method according to claim 6, wherein the processor is a graphical processing unit (GPU).

* * * * *